J. D. O'DONNELL.
Retort Stand.
No. 44,447.　　　　　　　　　　Patented Sept. 27, 1864.
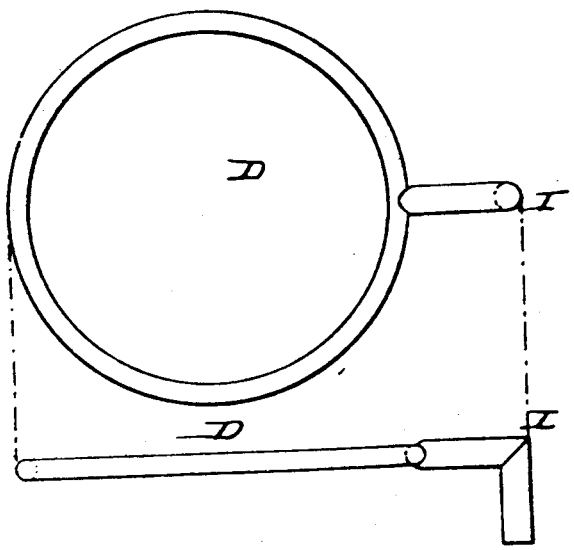
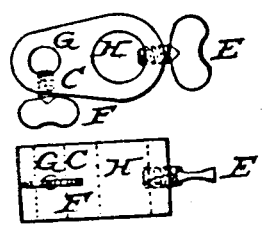
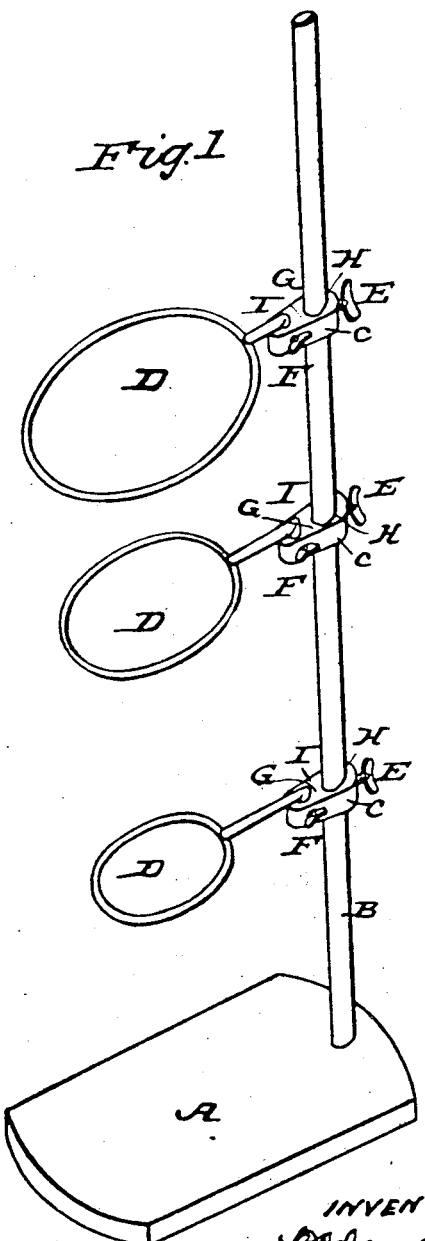
WITNESSES　　　　　　　　　　INVENTOR

UNITED STATES PATENT OFFICE.

J. D. O'DONNELL, OF WASHINGTON, DISTRICT OF COLUMBIA.

IMPROVEMENT IN RETORT-STANDS.

Specification forming part of Letters Patent No. 44,447, dated September 27, 1864; antedated September 16, 1864.

*To all whom it may concern:*

Be it known that I, J. D. O'DONNELL, of Washington, in the county of Washington and District of Columbia, have invented new and useful sliding clamps and concentric rings combined together, so as to make a valuable improvement on retort stands; and I do hereby declare that the following is a full, clear, and exact description of the construction and operation of same, reference being had to the annexed drawings, making a part of this specification, of which—

Figure 1 is a view of the whole machine, showing base A and upright rod B as used in the old style of retort-stands, with concentric rings D and clamps C of my improved pattern in position on same; Fig. 2, the plan of the concentric rings; Fig. 3, the elevation of same; Fig. 4, plan of sliding clamps C; Fig. 5, the elevation of same.

The nature of my improvement consists in making the concentric rings D and sliding clamps C separate, as shown in Figs. 3 and 5, instead of being connected as in old style, the slides C having two orifices, G and H, as shown in Fig. 4, and two set screws—one, E, at back of clamp, to secure the slide C to upright rod B; the other, F, either at side or end of clamp, and securing concentric rings, which hook into orifice G, position of set-screws E and F being shown in Fig. 5; the concentric rings D having the end of shank I turned down to form a hook, as shown in Fig. 3, the hook fitting into orifice G, and being there secured by set-screw F, thus making slides C support in a horizontal position rings D, as shown in Fig. 1, orifice H permitting slide C to move up and down rod B, and be held in position at any point by set-screw E, as also shown in Fig. 1.

The manner of the slide C being fixed on rod B is only as in old-style stands, where ring and slide are connected in one.

The great advantage gained by having rings D and slides C separate is that when desirable or necessary, as is often the case in chemical and pharmaceutical processes, the rings D may be changed in position by merely loosing the set-screws F, and lifting the rings out of orifices G—as, for instance, if desirable to change the lowest ring to the top, it may be done without disturbing the intermediate ring, thus obviating entirely the necessary trouble of sliding off from upright rod, and replacing in desired positions all the rings, as would be the case in the old style were such a change necessary.

What I claim as my invention, and desire to secure by Letters Patent, is—

Making the rings and sliding clamps separate, the rings having ends of shanks bent to form hook, the slides C having the extra orifice G, which, with set-screw F, forms a clamp, combining thus with orifice H a slide of old style, as connected with ring of old stand, and a clamp, the first moving up and down the rod B, and securing by set-screw E the slides C at any point, the latter admitting the hook on end of shank I to ring D, and forming by means of set-screw F the ring and slide combined, gaining all the advantages before claimed, and operating as before described.

J. D. O'DONNELL.

Witnesses:
RICHD. F. BOISEAU,
FRANKLIN S. OBER.